(No Model.)
H. REPLOGLE.
SPIRIT LEVEL.
No. 462,736. Patented Nov. 10, 1891.
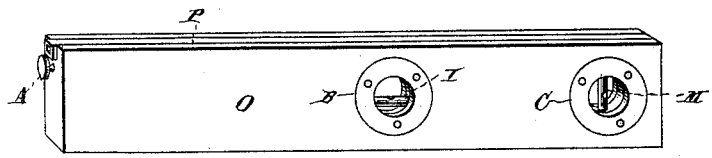
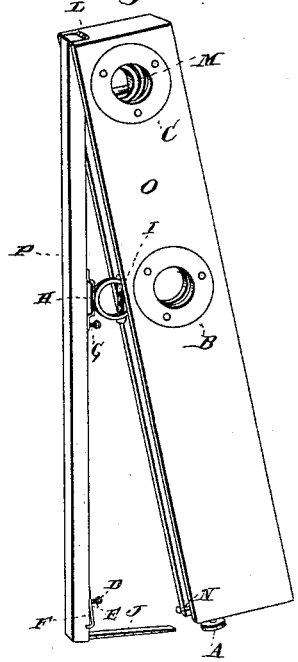
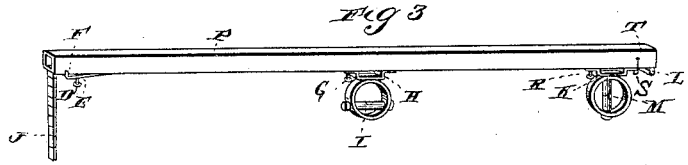
Witnesses: M. W. Hicks, Thomas Spence
Inventor: Henry Replogle

UNITED STATES PATENT OFFICE.

HENRY REPLOGLE, OF HASTINGS, MICHIGAN.

SPIRIT-LEVEL.

SPECIFICATION forming part of Letters Patent No. 462,736, dated November 10, 1891.

Application filed September 22, 1890. Serial No. 365,850. (No model.)

*To all whom it may concern:*

Be it known that I, HENRY REPLOGLE, a citizen of the United States, residing at Hastings, in the county of Barry and State of Michigan, have invented a new and useful Leveling-Instrument, of which the following is a specification.

My invention relates to improvements in leveling-instruments in which a stalk or bed-piece operates in conjunction with a tube which is provided with sights and spirit plumbing and leveling bulbs.

The objects of my improvement are, first, to get any inclination or slant required with perfect accuracy of any height or distance; second, to get a perfect level of either a short or long distance by the aid of the sighted tube; third, by its arrangement for perfect adjustment the under side of a beam or shaft or anything of the kind may be accurately leveled as well as the top side, and, fourth, for measuring the height of a tree or any tall object.

Figure 1 is a horizontal representation of the combined instrument as set for leveling, and when used for plumbing it is held perpendicular with the end downward. Fig. 2 represents the instrument in giving an inclination or slant, with sight-tube held up by the adjusting-scale J and thumb-screw A. Fig. 3 is a detailed view of the sight-tube, with its spirit-bulbs, adjusting-screws, &c.

The stock or bed-piece O is grooved or made hollow for the reception of the tube P, with the attached spirit-bulbs I and M, as shown in Fig. 2. The stock has holes cut through at B and C, Fig. 1, for showing the spirit-bulbs I and M, Figs. 2 and 3, and a thumb-screw A for holding the sliding scale J for the adjustment of the tube P in giving an inclination or slant. The stock O is provided with an adjusting-screw N, Fig. 2, in the bottom of the groove, as shown, by cutting a section from the stock for the purpose of adjusting the tube P when shut in, as in Fig. 1, so that the top side of the instrument is perfectly level when the bottom side is level in the position of Fig. 1.

The tube P, Fig. 3, is provided with a hinge L, which holds it to the stock, as shown in Fig. 2, by cutting away a section of the stock. The spirit-bulbs I and M pass through a ring or band attached to a spring H and K, which is fastened to the tube P. The said springs are provided with adjusting-screws G and R for the adjustment of the spirit-bulbs. The tube P has a cross-hair in the center near the end at T, which goes straight through the tube crosswise and comes out on both sides, and goes down the outside and fastens on the bottom of the tube under the head of the screw marked S, and at the other end of the tube from the cross-hair is an eye-piece that goes up in the tube from the bottom, with a needle-hole in the center, (marked F, Fig. 2,) with a section of the tube cut out. The eye-piece F, Fig. 2, is attached to the spring E, Fig. 3, and made adjustable by the screw D. Fig. 3.

The needle-hole in the eye-piece and the cross-hair in the other end of the tube constitute the sights.

I am aware that prior to my invention leveling-instruments have been made with small hole and cross-hair sights; but What I do claim as my invention, and desire to secure by Letters Patent, is—

The combination, in a leveling-instrument, of a stock O, hinged to a tube P, which is provided with sights inside F and T, and also provided with spirit plumbing and leveling bulbs I and M, and an adjusting-scale J, substantially as set forth, for the purposes specified.

HENRY REPLOGLE.

Witnesses:
 Z. B. HOYT,
 JOS. MAYERS.